United States Patent
Peng

(10) Patent No.: US 11,573,908 B1
(45) Date of Patent: Feb. 7, 2023

(54) MAPPING TABLE MANAGEMENT METHOD, MEMORY CONTROL CIRCUIT UNIT AND MEMORY STORAGE DEVICE

(71) Applicant: Hefei Core Storage Electronic Limited, Anhui (CN)

(72) Inventor: Chong Peng, Anhui (CN)

(73) Assignee: Hefei Core Storage Electronic Limited, Anhui (CN)

( * ) Notice: Subject to any disclaimer, the term of this patent is extended or adjusted under 35 U.S.C. 154(b) by 0 days.

(21) Appl. No.: 17/581,969

(22) Filed: Jan. 23, 2022

(30) Foreign Application Priority Data

Dec. 29, 2021 (CN) .......................... 202111644548.6

(51) Int. Cl.
*G06F 12/00* (2006.01)
*G06F 12/1027* (2016.01)
*G06F 12/02* (2006.01)

(52) U.S. Cl.
CPC ...... *G06F 12/1027* (2013.01); *G06F 12/0238* (2013.01); *G06F 2212/202* (2013.01); *G06F 2212/70* (2013.01)

(58) Field of Classification Search
CPC ............. G06F 12/1027; G06F 12/0238; G06F 12/0246; G06F 12/10; G06F 2212/202; G06F 2212/70; G06F 2212/7201; G06F 2212/7203; G06F 2212/7207
See application file for complete search history.

(56) References Cited

U.S. PATENT DOCUMENTS

| | | | | |
|---|---|---|---|---|
| 2012/0297118 | A1* | 11/2012 | Gorobets | G06F 3/0679 711/E12.008 |
| 2015/0106556 | A1* | 4/2015 | Yu | G06F 12/0246 711/103 |
| 2019/0340134 | A1* | 11/2019 | Haswell | G06F 12/1018 |

* cited by examiner

*Primary Examiner* — Shawn X Gu
(74) *Attorney, Agent, or Firm* — JCIPRNET

(57) ABSTRACT

A mapping table management method, a memory control circuit unit, and a memory storage device are provided. The method includes: receiving a read command from a host system, wherein the read command indicates reading a first data stored in at least one first logical address; and searching whether a relation management information reflects that a first group static mapping table recording the first logical address is related to a dynamic mapping table. In response to a search result reflecting that the first group static mapping table is related to the dynamic mapping table, the dynamic mapping table is searched to obtain a first physical address mapped by the first logical address. And if not related, the first group static mapping table among group static mapping tables is searched to obtain a second physical address mapped by the first logical address.

24 Claims, 10 Drawing Sheets

901

| Logical address index | Physical address |
|---|---|
| LBA(0)-0 | 410(0)-0 |
| LBA(0)-1 | 410(0)-1 |
| LBA(0)-2 | 410(0)-2 |

902

| Logical address index | Physical address |
|---|---|
| LBA(1)-0 | 410(1)-0 |
| LBA(1)-1 | 410(1)-1 |
| LBA(1)-2 | 410(1)-2 |

903

| Logical address index | Physical address |
|---|---|
| LBA(2)-0 | 410(2)-0 |
| LBA(2)-1 | 410(2)-1 |
| LBA(2)-2 | 410(2)-2 |

FIG. 9

MAPPING TABLE MANAGEMENT METHOD, MEMORY CONTROL CIRCUIT UNIT AND MEMORY STORAGE DEVICE

CROSS-REFERENCE TO RELATED APPLICATION

This application claims the priority benefit of China application serial no. 202111644548.6, filed on Dec. 29, 2021. The entirety of the above-mentioned patent application is hereby incorporated by reference herein and made a part of this specification.

BACKGROUND OF THE INVENTION

Field of the Invention

The invention relates to a memory management technique, and more particularly, to a mapping table management method, a memory control circuit unit, and a memory storage device.

Description of Related Art

The growth of digital cameras, mobile phones, and MP3 players has been rapid in recent years. Consequently, the consumers' demand for storage media has increased tremendously. Since the rewritable non-volatile memory has characteristics such as data non-volatility, power-saving, small size, lack of mechanical structure, and fast reading speed, the rewritable non-volatile memory is most suitable for electronic products such as notebook computers. A solid-state disc is a memory storage device adopting flash memory as storage medium. Therefore, the flash memory industry has become a relatively important part in the electronic industry in recent years.

The flash memory module has a plurality of physical erase units and each of the physical erase units has a plurality of physical pages, wherein when writing data in the physical erase units, the data needs to be written according to the sequence of the physical programming units. Moreover, the physical programming units with data written in them need to be erased before they may be used for writing data again. In particular, the physical erase units are the smallest unit of erasing, and the physical programming units are the smallest unit of programming (also called writing). Therefore, in the management of the flash memory module, the physical erase units are divided into a data area and a free area.

The physical erase units of the data area are configured to store the data stored in the host system. Specifically, the memory management circuit in the memory storage device converts the logical access address accessed by the host system into the logical pages of the logical blocks and maps the logical pages of the logical blocks to the physical programming units of the physical erase units of the data area. That is, the physical erase units of the managed data area of the flash memory module are regarded as the physical erase units that are already used (for example, already storing data written by the host system). For example, the memory management circuit uses a logical address-physical address mapping table to record the mapping relationship between the logical pages and the physical programming units of the data area.

In the traditional method of updating the mapping information in the logical address-physical address mapping table, the following three steps are usually performed in sequence: loading the logical address-physical address mapping table; updating the mapping information of the logical address-physical address mapping table; and storing the updated logical address-physical address mapping table back to the rewritable non-volatile memory module.

However, before the logical address-physical address mapping table is updated, the mapping relationship between the logical pages and the physical programming units of the data area is first recorded in one dynamic logical address-physical address mapping table of the buffer memory, and the logical address-physical address mapping table is not updated temporarily. And only at an appropriate time is the logical address-physical address mapping table loaded into the buffer memory to update the logical address-physical address mapping table. In other words, in the process of reading data, it takes time for the memory management circuit to search the dynamic logical address-physical address mapping table and the static logical address-physical address mapping table to obtain the latest mapping information of the logical pages, thus affecting the performance of the memory management circuit when reading data.

SUMMARY OF THE INVENTION

The invention provides a mapping table management method, a memory control circuit unit, and a memory storage device that may effectively improve the speed of the memory management circuit searching the physical address of data storage, thereby improving the performance of the memory management circuit when reading data.

An exemplary embodiment of the invention provides a mapping table management method suitable for a rewritable non-volatile memory module. In particular, the rewritable non-volatile memory module includes a plurality of physical programming units, the rewritable non-volatile memory module stores a static mapping table, and the static mapping table is divided into a plurality of group static mapping tables. The mapping table management method includes: storing a dynamic mapping table and a relation management information in a buffer memory, wherein the dynamic mapping table records a logical address corresponding to a write data and a physical address mapped by the logical address, and the relation management information reflects the group static mapping table related to the logical address recorded in the dynamic mapping table; receiving a read command from a host system, wherein the read command instructs to read a first data stored in at least one first logical address; and searching whether the relation management information reflects that a first group static mapping table recording the first logical address is related to the dynamic mapping table. In response to a search result reflecting that the first group static mapping table is related to the dynamic mapping table, the dynamic mapping table is searched to obtain a first physical address mapped by the first logical address. In response to the search result not reflecting that the first group static mapping table is related to the dynamic mapping table, the first group static mapping table among the group static mapping tables is searched to obtain a second physical address mapped by the first logical address.

In an exemplary embodiment of the invention, the method further includes: reading a data stored in the first physical address or the second physical address.

In an exemplary embodiment, before the step of searching the first group static mapping table in the group static mapping table to obtain the second physical address mapped by the first logical address, the mapping table management information includes: searching an address management information to obtain a storage address of the first group static mapping table in the rewritable non-volatile memory module; and reading the first group static mapping table from the storage address.

In an exemplary embodiment of the invention, the method further includes: receiving a write command corresponding to a second data from the host system, wherein the second data corresponds to the first logical address; sending a command sequence to the rewritable non-volatile memory module to instruct a control circuit of the rewritable non-volatile memory module to write the second data to a first physical programming unit in the plurality of physical programming units; and updating the dynamic mapping table and the relation management information according to the first logical address and a physical address of the first physical programming unit in the process of writing the second data to the first physical programming unit via the control circuit of the rewritable non-volatile memory module.

In an exemplary embodiment of the invention, the step of updating the dynamic mapping table and the relation management information according to the first logical address and the physical address of the first physical programming unit includes updating a mapping information of the dynamic mapping table such that the first logical address is mapped to the physical address of the first physical programming unit.

In an exemplary embodiment of the invention, the method further includes, after the mapping information of the dynamic mapping table is updated: loading the first group static mapping table among the plurality of group static mapping tables from the rewritable non-volatile memory module into the buffer memory according to the mapping information of the dynamic mapping table; updating the first group static mapping table according to the mapping information of the dynamic mapping table such that the first logical address is mapped to the physical address of the first physical programming unit; and storing the updated first group static mapping table back to the rewritable non-volatile memory module after the first group static mapping table is updated.

In an exemplary embodiment of the invention, the step of updating the first group static mapping table further includes: updating the relation management information such that the relation management information no longer reflects that the first group static mapping table is related to the dynamic mapping table.

In an exemplary embodiment of the invention, the step of updating the dynamic mapping table and the relation management information according to the first logical address and the physical address of the first physical programming unit includes: updating the relation management information such that the relation management information reflects that the first group static mapping table recording the first logical address is related to the dynamic mapping table.

An exemplary embodiment of the invention provides a memory control circuit unit configured to control a rewritable non-volatile memory module. In particular, the rewritable non-volatile memory module includes a plurality of physical programming units, the rewritable non-volatile memory module stores a static mapping table, and the static mapping table is divided into a plurality of group static mapping tables. The memory control circuit unit includes a host interface, a memory interface, and a memory management circuit. The host interface is configured to be coupled to a host system. The memory interface is configured to be coupled to the rewritable non-volatile memory module. The memory management circuit is coupled to the host interface and the memory interface. The memory management circuit is configured to store a dynamic mapping table and a relation management information in a buffer memory, the dynamic mapping table records a logical address corresponding to a write data and a physical address mapped by the logical address, and the relation management information reflects the group static mapping table related to the logical address recorded in the dynamic mapping table. The memory management circuit is further configured to receive a read command from the host system, wherein the read command instructs to read a first data stored in at least one first logical address. Moreover, the memory management circuit is further configured to search whether the relation management information reflects that a first group static mapping table recording the first logical address is related to the dynamic mapping table. In response to a search result reflecting that the first group static mapping table is related to the dynamic mapping table, the memory management circuit is further configured to search the dynamic mapping table to obtain a first physical address mapped by the first logical address. In response to the search result not reflecting that the first group static mapping table is related to the dynamic mapping table, the memory management circuit is further configured to search the first group static mapping table among the group static mapping tables to obtain a second physical address mapped by the first logical address.

In an exemplary embodiment of the invention, the memory management circuit is further configured to read a data stored in the first physical address or the second physical address.

In an exemplary embodiment of the invention, before searching the first group static mapping table among the group static mapping tables to obtain the second physical address mapped by the first logical address, the memory management circuit is further configured to search an address management information to obtain a storage address of the first group static mapping table in the rewritable non-volatile memory module. Moreover, the memory management circuit is further configured to read the first group static mapping table from the storage address.

In an exemplary embodiment of the invention, the memory management circuit is further configured to receive a write command corresponding to a second data from the host system, wherein the second data corresponds to the first logical address. The memory management circuit is further configured to send a command sequence to the rewritable non-volatile memory module to instruct a control circuit of the rewritable non-volatile memory module to write the second data to a first physical programming unit in the plurality of physical programming units. Moreover, the memory management circuit is further configured to update the dynamic mapping table and the relation management information according to the first logical address and the physical address of the first physical programming unit in the process of writing the second data to the first physical programming unit via the control circuit of the rewritable non-volatile memory module.

In an exemplary embodiment of the invention, in the operation of updating the dynamic mapping table and the relation management information according to the first logical address and the physical address of the first physical programming unit, the memory management circuit is further configured to update a mapping information of the dynamic mapping table such that the first logical address is mapped to the physical address of the first physical programming unit.

In an exemplary embodiment of the invention, after updating the mapping information of the dynamic mapping table, the memory management circuit is further configured to load the first group static mapping table among the plurality of group static mapping tables from the rewritable non-volatile memory module into the buffer memory according to the mapping information of the dynamic mapping table. The memory management circuit is further configured to update the first group static mapping table according to the mapping information of the dynamic mapping table such that the first logical address is mapped to the physical address of the first physical programming unit. Moreover, the memory management circuit is further configured to store the updated first group static mapping table back to the rewritable non-volatile memory module after updating the first group static mapping table.

In an exemplary embodiment of the invention, in the operation of updating the first group static mapping table, the memory management circuit is further configured to update the relation management information such that the relation management information no longer reflects that the first group static mapping table is related to the dynamic mapping table.

In an exemplary embodiment of the invention, in the operation of updating the dynamic mapping table and the relation management information according to the first logical address and the physical address of the first physical programming unit, the memory management circuit is further configured to update the relation management information such that the relation management information reflects that the first group static mapping table recording the first logical address is related to the dynamic mapping table.

An exemplary embodiment of the invention provides a memory storage device including a connection interface unit, a rewritable non-volatile memory module, and a memory control circuit unit. The connection interface unit is configured to be coupled to a host system. The rewritable non-volatile memory module includes a plurality of physical programming units, the rewritable non-volatile memory module stores a static mapping table, and the static mapping table is divided into a plurality of group static mapping tables. The memory control circuit unit is coupled to the connection interface unit and the rewritable non-volatile memory module. The memory control circuit unit is configured to store a dynamic mapping table and a relation management information in a buffer memory, the dynamic mapping table records a logical address corresponding to a write data and a physical address mapped by the logical address, and the relation management information reflects the group static mapping table related to the logical address recorded in the dynamic mapping table. The memory control circuit unit is further configured to receive a read command from the host system, wherein the read command instructs to read a first data stored in at least one first logical address. Moreover, the memory control circuit unit is further configured to search whether the relation management information reflects that a first group static mapping table recording the first logical address is related to the dynamic mapping table. In response to a search result reflecting that the first group static mapping table is related to the dynamic mapping table, the memory control circuit unit is further configured to search the dynamic mapping table to obtain a first physical address mapped by the first logical address. In response to the search result not reflecting that the first group static mapping table is related to the dynamic mapping table, the memory control circuit unit is further configured to search the first group static mapping table among the group static mapping tables to obtain a second physical address mapped by the first logical address.

In an exemplary embodiment of the invention, the memory control circuit unit is further configured to read a data stored in the first physical address or the second physical address.

In an exemplary embodiment of the invention, before searching the first group static mapping table in the group static mapping table to obtain the second physical address mapped by the first logical address, the memory control circuit unit is further configured to search an address management information to obtain a storage address of the first group static mapping table in the rewritable non-volatile memory module. Moreover, the memory control circuit unit is further configured to read the first group static mapping table from the storage address.

In an exemplary embodiment of the invention, the memory control circuit unit is further configured to receive a write command corresponding to a second data from the host system, wherein the second data corresponds to the first logical address. The memory control circuit unit is further configured to send a command sequence to the rewritable non-volatile memory module to instruct a control circuit of the rewritable non-volatile memory module to write the second data to a first physical programming unit in the plurality of physical programming units. Moreover, the memory control circuit unit is further configured to update the dynamic mapping table and the relation management information according to the first logical address and the physical address of the first physical programming unit in the process of writing the second data to the first physical programming unit via the control circuit of the rewritable non-volatile memory module.

In an exemplary embodiment of the invention, in the operation of updating the dynamic mapping table and the relation management information according to the first logical address and the physical address of the first physical programming unit, the memory control circuit unit is further configured to update a mapping information of the dynamic mapping table such that the first logical address is mapped to the physical address of the first physical programming unit.

In an exemplary embodiment of the invention, after updating the mapping information of the dynamic mapping table, the memory control circuit unit is further configured to load the first group static mapping table among the plurality of group static mapping tables from the rewritable non-volatile memory module into the buffer memory according to the mapping information of the dynamic mapping table. The memory control circuit unit is further configured to update the first group static mapping table according to the mapping information of the dynamic mapping table such that the first logical address is mapped to the physical address of the first physical programming unit. Moreover, the memory control circuit unit is further configured to store the updated first group static mapping table back to the rewritable non-volatile memory module after updating the first group static mapping table.

In an exemplary embodiment of the invention, in the operation of updating the first group static mapping table, the memory control circuit unit is further configured to update the relation management information such that the relation management information no longer reflects that the first group static mapping table is related to the dynamic mapping table.

In an exemplary embodiment of the invention, in the operation of updating the dynamic mapping table and the relation management information according to the first logical address and the physical address of the first physical programming unit, the memory control circuit unit is further configured to update the relation management information such that the relation management information reflects that the first group static mapping table recording the first logical address is related to the dynamic mapping table.

Based on the above, the mapping table management method, the memory control circuit unit, and the memory storage device of the invention may record the information of the group static mapping table related to the logical address in the relation management information, and when a data read operation is performed, whether the relation management information reflects that the group static mapping table of the logical address to which the data to be read belongs is related to the dynamic mapping table is first searched. In other words, the mapping table management method of the invention may search the relation management information before searching the dynamic mapping table to quickly obtain whether the latest mapping information of the data to be read is recorded in the dynamic mapping table. Therefore, when the latest mapping information of the data to be read is not recorded in the dynamic mapping table, it takes time to search the dynamic mapping table and the static mapping table to obtain the latest mapping information. Therefore, the mapping table management method of the invention may effectively improve the speed of the memory management circuit searching the physical address stored in the data when a data read operation is performed. Therefore, the performance of the memory management circuit when reading data is improved.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 9 is a simplified example of a group static mapping table shown according to an embodiment of the invention.

DESCRIPTION OF THE EMBODIMENTS

In general, a memory storage device (also referred to as a memory storage system) includes a rewritable non-volatile memory module and a controller (also referred to as a control circuit). The memory storage device is generally used with a host system, such that the host system may write data into the memory storage device or read data from the memory storage device.

Figure 1:
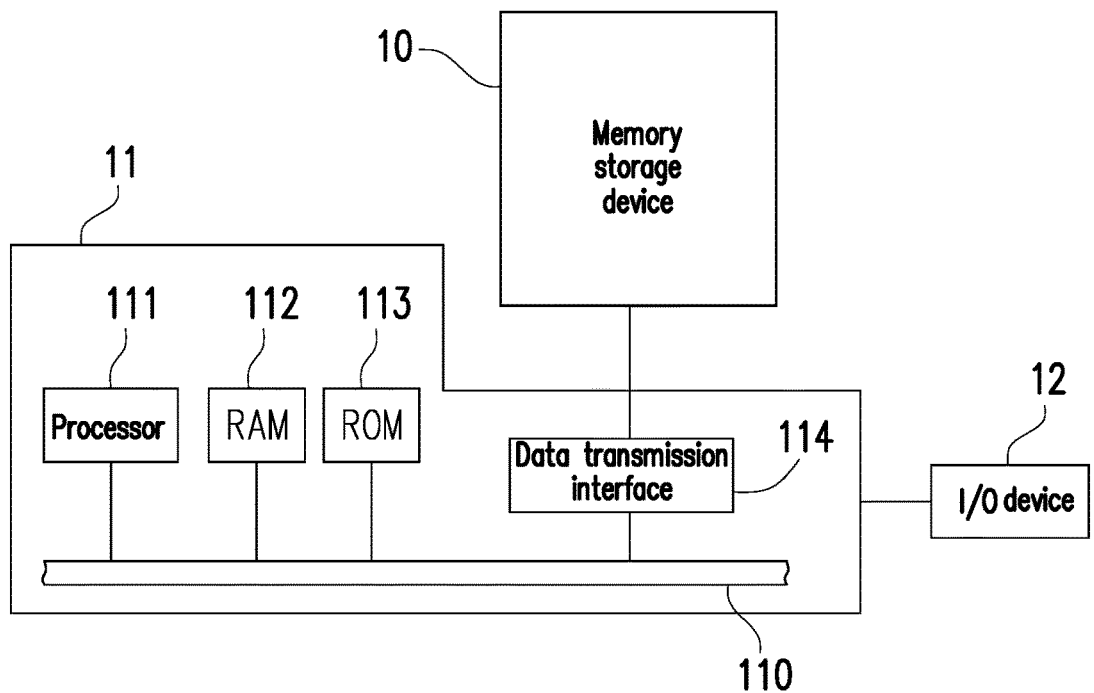
FIG. 1 is a schematic diagram of a host system, a memory storage device, and an input/output (I/O) device shown according to an exemplary embodiment of the invention.
Figure 2:
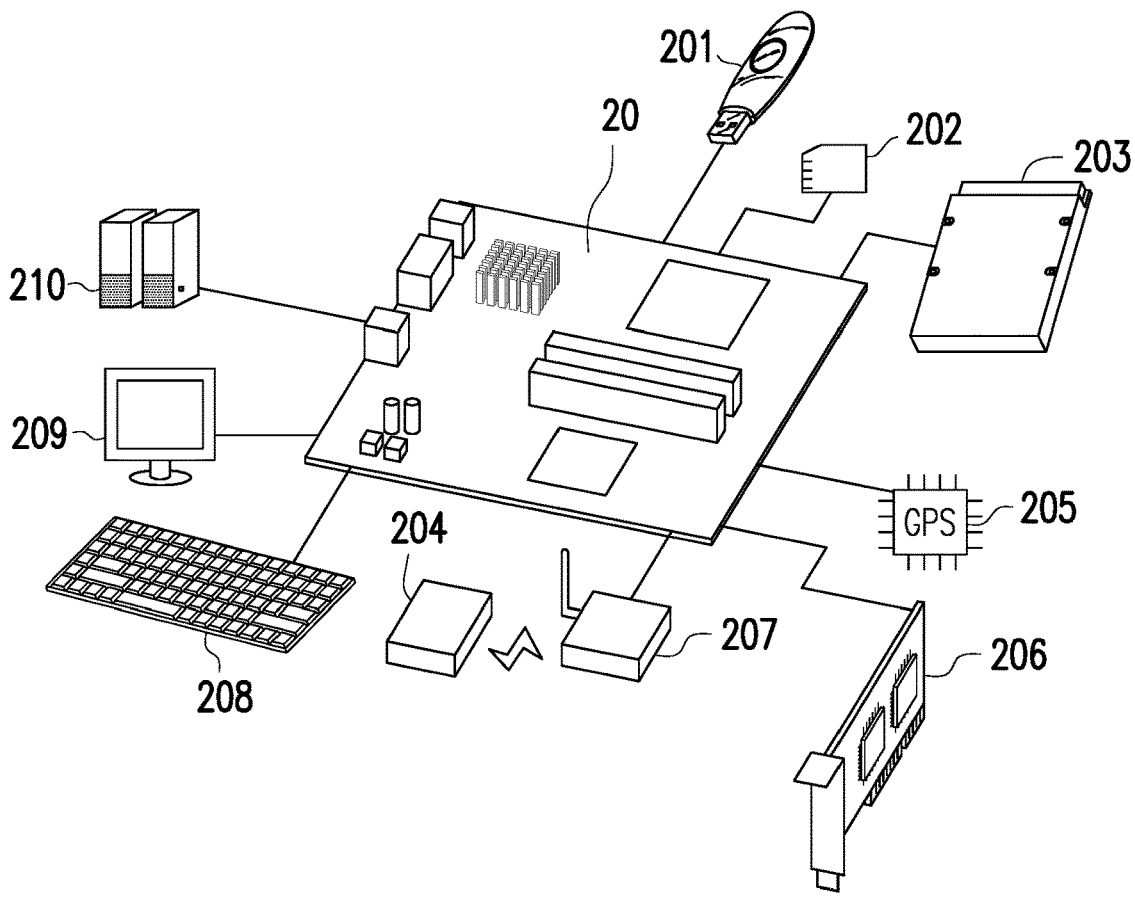
FIG. 2 is a schematic of a host system, a memory storage device, and an I/O device shown according to another exemplary embodiment of the invention.

FIG. 1 is a schematic diagram of a host system, a memory storage device, and an input/output (I/O) device shown according to an exemplary embodiment of the invention. FIG. 2 is a schematic of a host system, a memory storage device, and an I/O device shown according to another exemplary embodiment of the invention.

Referring to FIG. 1 and FIG. 2, a host system 11 generally includes a processor 111, a random-access memory (RAM) 112, a read-only memory (ROM) 113, and a data transmission interface 114. The processor 111, the RAM 112, the ROM 113, and the data transmission interface 114 are all coupled to a system bus 110.

In the present exemplary embodiment, the host system 11 is coupled to a memory storage device 10 via the data transmission interface 114. For example, the host system 11 may store data into the memory storage device 10 or read data from the memory storage device 10 via the data transmission interface 114. Moreover, the host system 11 is coupled to an I/O device 12 via the system bus 110. For example, the host system 11 may send an output signal to the I/O device 12 or receive an input signal from the I/O device 12 via the system bus 110.

In the present exemplary embodiment, the processor 111, the RAM 112, the ROM 113, and the data transmission interface 114 may be disposed on a motherboard 20 of the host system 11. The quantity of the data transmission interface 114 may be one or a plurality. The motherboard 20 may be coupled to the memory storage device 10 in a wired or wireless method via the data transmission interface 114. The memory storage device 10 may be, for example, a flash drive 201, a memory card 202, a solid-state drive (SSD) 203, or a wireless memory storage device 204. The wireless memory storage device 204 may be, for example, a memory storage device based on various wireless communication techniques such as a near-field communication (NFC) memory storage device, a wireless fax (WiFi) memory storage device, a Bluetooth memory storage device, or a low-power Bluetooth memory storage device (such as iBeacon). Moreover, the motherboard 20 may also be coupled to various I/O devices such as a global positioning system (GPS) module 205, a network interface card 206, a wireless transmission device 207, a keyboard 208, a screen 209, or a speaker 210 via the system bus 110. For example, in an exemplary embodiment, the motherboard 20 may access the wireless memory storage device 204 via the wireless transmission device 207.

Figure 3:
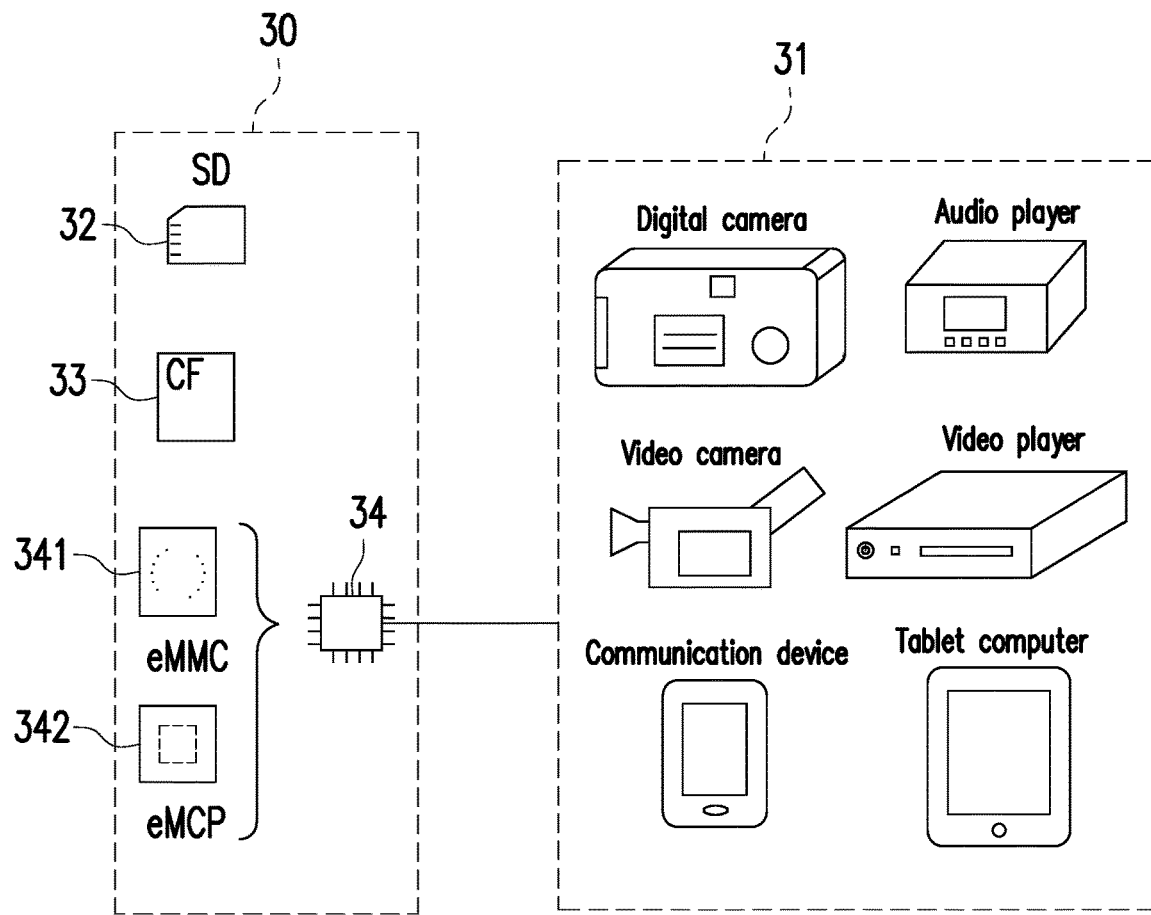
FIG. 3 is a schematic of a host system and a memory storage device shown according to another exemplary embodiment of the invention.

In an exemplary embodiment, the mentioned host is any system that may substantially store data with a memory storage device. Although in the above exemplary embodiment, the host system is exemplified by a computer system, FIG. 3 is a schematic of a host system and a memory storage device shown according to another exemplary embodiment of the invention. Referring to FIG. 3, in another exemplary embodiment, a host system 31 may also be a system such as a digital camera, a video camera, a communication device, an audio player, a video player, or a tablet computer, and the memory storage device 30 may be various non-volatile memory storage devices used thereby such as a secure digital (SD) card 32, a compact flash (CF) card 33, or an embedded storage device 34. The embedded storage device 34 includes various types of embedded storage devices for which a memory module is directly coupled on the substrate of the host system, such as an embedded MMC (eMMC) 341, and/or an embedded multi-chip package (eMCP) 342.

Figure 4:
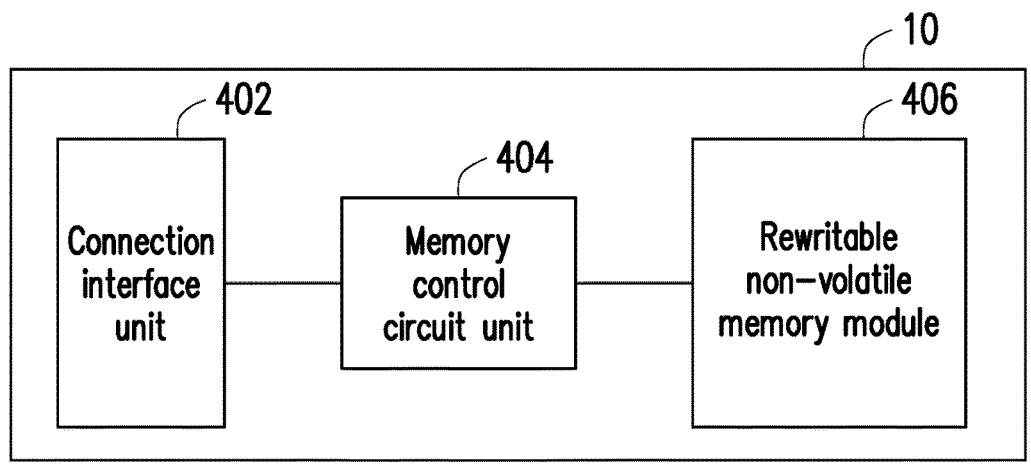
FIG. 4 is a schematic block diagram of a memory storage device shown according to an exemplary embodiment of the invention.

FIG. 4 is a schematic block diagram of a memory storage device shown according to an exemplary embodiment of the invention.

Referring to FIG. 4, the memory storage device 10 includes a connection interface unit 402, a memory control circuit unit 404, and a rewritable non-volatile memory module 406.

In the present exemplary embodiment, the connection interface unit 402 is compatible with the serial advanced technology attachment (SATA) standard. However, it should be understood that, the invention is not limited thereto, and the connection interface unit 402 may also satisfy the parallel advanced technology attachment (PATA) standard, Institute of Electrical and Electronic Engineers (IEEE) 1394 standard, peripheral component interconnect express (PCI express) interface standard, universal serial bus (USB) standard, SD interface standard, Ultra High Speed-I (UHS-I) interface standard, Ultra High Speed-II (UHS-II) interface standard, memory sick (MS) interface standard, multi-chip package interface standard, MMC interface standard, eMMC interface standard, Universal Flash Storage (UFS) interface standard, eMCP interface standard, CF interface standard, integrated device electronics (IDE) interface standard, or other suitable standards. The connection interface unit 402 may be sealed in a chip with the memory control circuit unit 404. Alternatively, the connection interface unit 402 is disposed outside of a chip containing the memory control circuit unit 404.

The memory control circuit unit 404 is configured to execute a plurality of logic gates or control commands implemented in a hardware form or in a firmware form. The memory control circuit unit 404 also performs operations such as writing, reading, and erasing data in the rewritable non-volatile memory storage module 406 according to the commands of the host system 11.

The rewritable non-volatile memory module 406 is coupled to the memory control circuit unit 404 and is configured to store data written by the host system 11. The rewritable non-volatile memory module 406 has a plurality of physical erase units. For example, the plurality of physical erase units may belong to the same memory die or different memory dies. Each of the physical erase units respectively has a plurality of physical programming units, wherein physical programming units belonging to the same physical erase unit may be independently written and erased at the same time. However, it should be understood that, the invention is not limited thereto. Each of the physical erase units may be formed by 64 physical programming units, 256 physical programming units, or any other number of physical programming units.

More specifically, the physical erase units are the smallest unit of erasing. That is, each of the physical erase units contains the smallest number of memory cells erased together. The physical programming units are the smallest unit of programming. That is, the physical programming units are the smallest unit of data writing. Each of the physical programming units generally includes a data bit area and a redundancy bit area. The data bit area contains a plurality of physical access addresses configured to store user data, and the redundancy bit area is configured to store system data (for example, control information and error-correcting code). In the present exemplary embodiment, the data bit area of each of the physical programming units contains 4 physical access addresses, and the size of one physical access address is 512 bytes. However, in other exemplary embodiments, the data bit area may also contain a greater or lesser number of physical access addresses, and the invention does not limit the size and the number of the physical access address. For example, in an exemplary embodiment, the physical erase units are physical blocks, and the physical programming units are physical pages or physical sectors, but the invention is not limited thereto.

In the present exemplary embodiment, the rewritable non-volatile memory module 406 is a multi-level cell (MLC) NAND flash memory module (that is, a flash memory module for which one memory cell may store 2 bit data). However, the invention is not limited thereto, and the rewritable non-volatile memory module 406 may also be a single-level cell (SLC) NAND flash memory module (that is, a flash memory module for which one memory cell may store 1 bit data), a trinary-level cell (TLC) NAND flash memory module (that is, a flash memory module for which one memory cell may store 3 bit data), other flash memory modules, or other memory modules having the same characteristics.

Each of the memory cells in the rewritable non-volatile memory module 406 stores one or a plurality of bits based on the change in voltage (also referred to as threshold voltage hereinafter). When a write command sequence or a read command sequence is received from the memory control circuit unit 404, the control circuit (not shown) in the rewritable non-volatile memory module 406 controls the voltage applied to a certain word line and a certain bit line (or a bit line group) to change the threshold voltage of at least one memory cell or to detect the storage state of the memory cell. For example, a charge-trapping layer is disposed between the control gate and the channel of each of the memory cells. By applying a write voltage (or programming voltage) to the control gate of a certain memory cell, the number of electrons in the charge-trapping layer thereof may be changed, thereby changing the threshold voltage of the memory cell. The process of changing the threshold voltage is also referred to as "writing data to memory cells" or "programming memory cells". As the threshold voltage is changed, the memory cells in the rewritable non-volatile memory module 406 may have a plurality of storage statuses. Which storage status one memory cell belongs to may be determined via the application of a read voltage, so as to obtain one or a plurality of bits stored by the memory cell.

Figure 5:
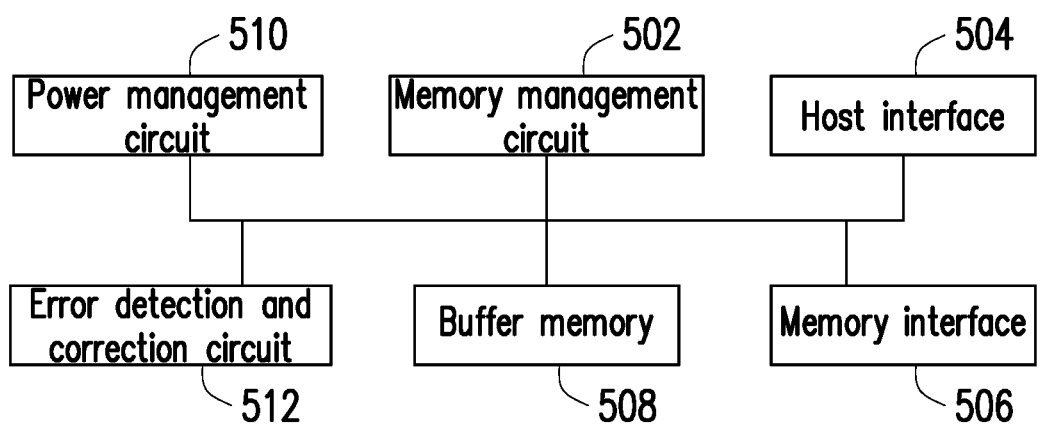
FIG. 5 is a schematic block diagram of a memory control circuit unit illustrated according to an exemplary embodiment.

FIG. 5 is a schematic block diagram of a memory control circuit unit shown according to an exemplary embodiment.

Referring to FIG. 5, the memory control circuit unit 404 includes a memory management circuit 502, a host interface 504, and a memory interface 506.

The memory management circuit 502 is configured to control the overall operation of the memory control circuit unit 404. Specifically, the memory management circuit 502 has a plurality of control commands. During the operation of the memory storage device 10, the control commands are executed to perform operations such as writing, reading, and erasing data. The following description of the operation of the memory management circuit 502 or any circuit element included in the memory control circuit unit 404 is equivalent to the description of the operation of the memory control circuit unit 404.

In the present exemplary embodiment, the control commands of the memory management circuit 502 are implemented in a firmware form. For example, the memory management circuit 502 has a microprocessor unit (not shown) and a read-only memory (not shown), and the control commands are burned into the ROM. During the operation of the memory storage device 10, the control commands are executed by the microprocessor unit to perform operations such as writing, reading, and erasing data.

In another exemplary embodiment of the invention, the control commands of the memory management circuit 502 may also be stored in the form of program codes into a specific area (for example, the system area in the memory module exclusively configured to store system data) of the rewritable non-volatile memory module 406. Moreover, the memory management circuit 502 has a microprocessor unit (not shown), a ROM (not shown), and a RAM (not shown). In particular, the ROM has a boot code, and when the memory control circuit unit 404 is enabled, the microprocessor unit first executes the activation code to load the control commands stored in the rewritable non-volatile memory module 406 into the RAM of the memory management circuit 502. Next, the microprocessor unit runs the control commands to perform operations such as writing, reading, and erasing data.

Further, in another exemplary embodiment of the invention, the control commands of the memory management circuit 502 may also be implemented in a hardware form. For example, the memory management circuit 502 includes a microcontroller, a memory cell management circuit, a memory write circuit, a memory read circuit, a memory erase circuit, and a data processing circuit. The memory cell management circuit, the memory write circuit, the memory read circuit, the memory erase circuit, and the data processing circuit are coupled to the microcontroller. In particular, the memory cell management circuit is configured to manage the physical erase units of the rewritable non-volatile memory module 406; the memory write circuit is configured to issue a write command to the rewritable non-volatile memory module 406 to write data to the rewritable non-volatile memory module 406; the memory read circuit is configured to issue a read command to the rewritable non-volatile memory module 406 so as to read data from the rewritable non-volatile memory module 406; the memory erase circuit is configured to issue an erase command to the rewritable non-volatile memory module 406 to erase data from the rewritable non-volatile memory module 406; and the data processing circuit is configured to process data to be written to the rewritable non-volatile memory module 406 and read data from the rewritable non-volatile memory module 406.

The host interface 504 is coupled to the memory management circuit 502 and configured to receive and identify commands and data sent by the host system 11. In other words, the commands and data sent by the host system 11 are sent to the memory management circuit 502 via the host interface 504. In the present exemplary embodiment, the host interface 504 is compatible with the SATA standard. However, it should be understood that the invention is not limited thereto, and the host interface 504 may also be compatible with the PATA standard, IEEE 1394 standard, PCI Express standard, USB standard, UHS-I standard, UHS-II standard, SD standard, MS standard, MMC standard, CF standard, IDE standard, or other suitable data transmission standards.

The memory interface 506 is coupled to the memory management circuit 502 and configured to access the rewritable non-volatile memory module 406. In other words, data to be written to the rewritable non-volatile memory module 406 is converted to a format acceptable to the rewritable non-volatile memory module 406 via the memory interface 506.

In an exemplary embodiment of the invention, the memory control circuit unit 404 further includes a buffer memory 508, a power management circuit 510, and an error detection and correction circuit 512.

The buffer memory 508 is coupled to the memory management circuit 502 and configured to temporarily store data and commands from the host system 11 or data from the rewritable non-volatile memory module 406. In an embodiment, the buffer memory 508 is further configured to store the physical address-logical address mapping table, and the physical address-logical address mapping table is configured to record mapping information between the physical programming units of an active physical erase units in the physical erase units and a plurality of updated logical addresses in the logical address. Specifically, when the host system 11 is to write update data to the rewritable non-volatile memory module 406, the memory management circuit 502 issues a command sequence to the rewritable non-volatile memory module 406, stores the update data in an active physical erase unit in the free area of the rewritable non-volatile memory module 406 according to the command sequence via the control circuit of the rewritable non-volatile memory module 406, and the physical address-logical address mapping table records the mapping information between the logical address of the write operation and the physical programming units in the active physical erase unit configured to store the update data thereof. Then, the memory management circuit 502 may further load the corresponding logical address-physical address mapping table from the rewritable non-volatile memory module 40 according to the physical address-logical address mapping table to update the mapping information in the logical address-physical address mapping table.

The power management circuit 510 is coupled to the memory management circuit 502 and configured to control the power of the memory storage device 10.

The error detection and correction circuit 512 is coupled to the memory management circuit 502 and configured to execute an error detection and correction process to ensure the correctness of data. Specifically, when the memory management circuit 502 receives a write command from the host system 11, the error detection and correction circuit 512 generates an error correction code (ECC) for the data corresponding to the write command, and the memory management circuit 502 writes the data and ECC corresponding to the write command to the rewritable non-volatile memory module 406. Next, when reading data from the rewritable non-volatile memory module 406, the memory management circuit 502 also reads the ECC corresponding to the data, and the error detection and correction circuit 512 performs an error detection and correction process on the read data based on the ECC.

Figure 6:
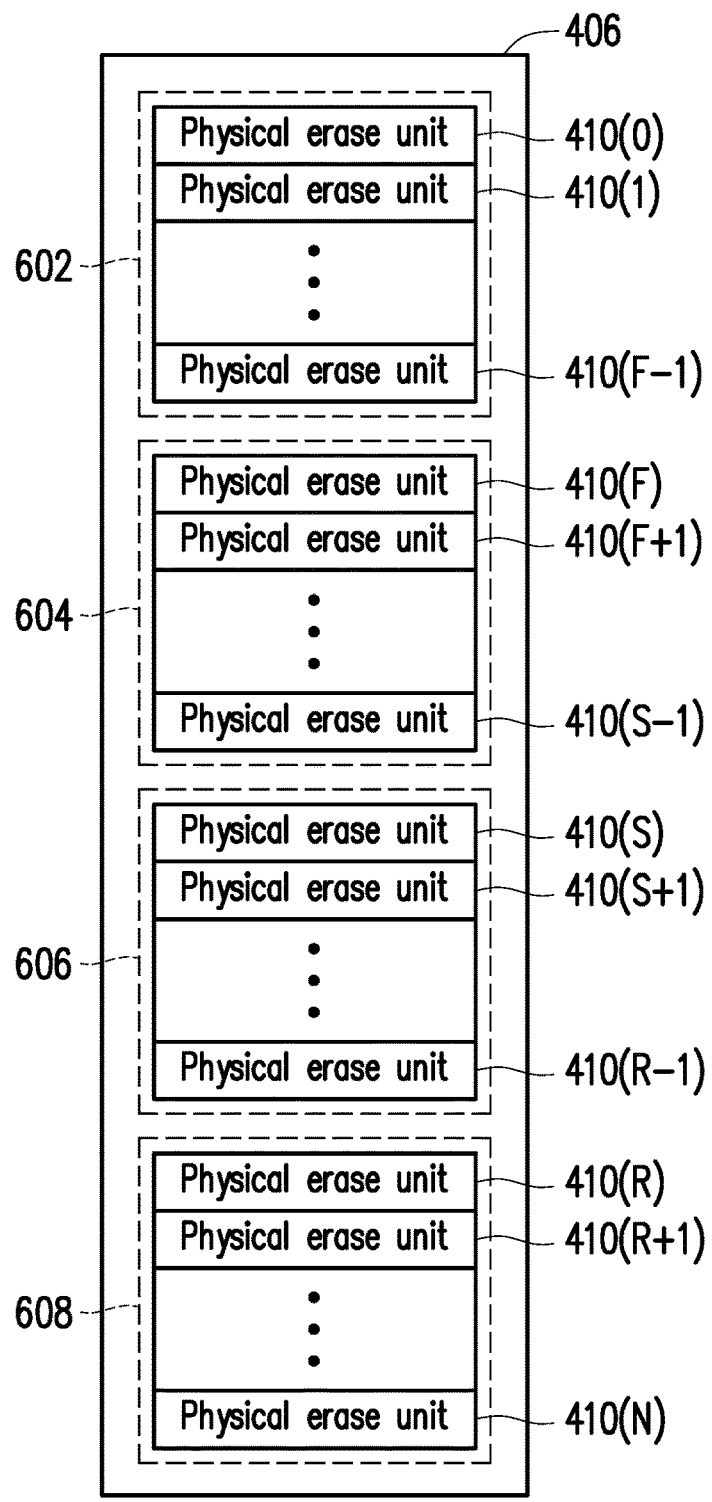
FIG. 6 and FIG. 7 are exemplary schematics of the management of physical erase units shown according to an exemplary embodiment.
Figure 7:
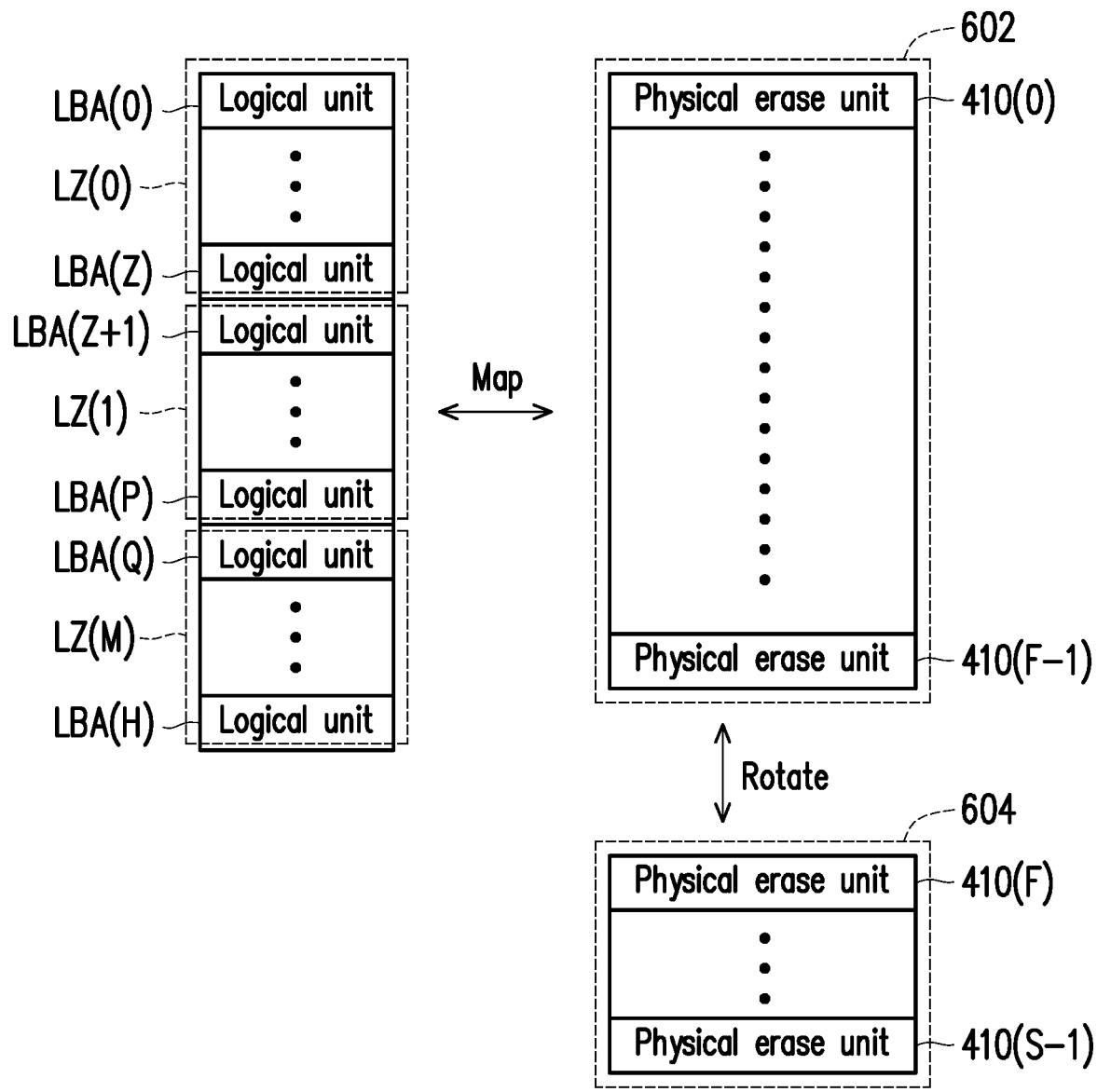

FIG. 6 and FIG. 7 are exemplary schematics of the management of physical erase units shown according to an exemplary embodiment.

Referring to FIG. 6, the rewritable non-volatile memory module 406 has physical erase units 410(0) to 410(N). The memory management circuit 502 logically groups the physical erase units 410(0) to 410(N) into a data area 602, a free area 604, a system area 606, and a replacement area 608.

The physical erase units logically belonging to the data area 602 and the free area 604 are configured to store data from the host system 11. Specifically, the physical erase units of the data area 602 are regarded as physical erase units in which data is stored, and the physical erase units of the free area 604 are configured to substitute the physical erase units of the data area 602. In other words, when the host system 11 receives a write command and data to be written, the memory management circuit 502 extracts the physical erase units from the free area 604, and writes data to the extracted physical erase units to replace the physical erase units of the data area 602.

The physical erase units logically belonging to the system area 606 are configured to record system data. For example, the system data includes the manufacturer and the model of the rewritable non-volatile memory module, the quantity of physical erase units of the rewritable non-volatile memory module, and the quantity of physical programming units of each of the physical erase units.

The physical erase units logically belonging to the replacement area 608 are configured for the replacement operation of damaged physical erase units to replace damaged physical erase units. Specifically, if the replacement area 608 still has normal physical erase units and the physical erase units of the data area 602 are damaged, then the memory management circuit 502 extracts normal physical erase units from the replacement area 608 to replace the damaged physical erase units.

In particular, the quantity of the physical erase units of the data area 602, the free area 604, the system area 606, and the replacement area 608 is different according to different memory specifications. Moreover, it should be understood that, in the operation of the memory storage device 10, the grouping relationship of the physical erase units to the data area 602, the free area 604, the system area 606, and the replacement area 608 is dynamically changed. For example, when the physical erase units in the free area 604 are damaged and replaced by the physical erase units of the replacement area 608, the original physical erase units of the replacement area 608 are related to the free area 604.

Referring to FIG. 7, the memory management circuit 502 configures logical units LBA(0) to LBA(H) to map the physical erase units of the data area 602, wherein each of the logical units has a plurality of logical pages to map the physical programming units of the corresponding physical erase unit. Moreover, when the host system 11 is to write data to the logical units or update data stored in the logical units, the memory management circuit 502 extracts one physical erase unit from the free area 604 as an active physical erase unit to write data so as to rotate the physical erase units of the data area 602.

To identify which physical erase unit the data of each of the logical units is stored in, in the present exemplary embodiment, the memory management circuit 502 records the mapping relationship between the logical units and the physical erase units. Moreover, when the host system 11 is to access data in a logical page, the memory management circuit 502 confirms the logical unit that the logical page belongs to, and data is accessed in the physical erase units mapped by the logical units. For example, in the present exemplary embodiment, the memory management circuit 502 stores a logic address-to-physical address mapping table in the rewritable non-volatile memory module 406 to record the physical erase units mapped by each of the logical units, and when data is to be accessed, the memory management circuit 502 loads the logic address-to-physical address mapping table into the buffer memory 508 for protection.

It should be mentioned that, since the capacity of the buffer memory 508 is limited and may not store the mapping table recording the mapping relationships of all of the logical units, in the present exemplary embodiment, the memory management circuit 502 groups the logical units LBA(0) to LBA(H) into a plurality of logical areas LZ(0) to LZ(M), and allocates one logical address-physical address mapping table (also referred to as a group logical address-physical address mapping table) for each of the logical areas. In particular, when the memory management circuit 502 is to update the mapping information of a certain logical unit, the logical address-physical address mapping table corresponding to the logical area to which the logical unit belongs is loaded into the buffer memory 508 for update.

In the present exemplary embodiment, when the host system 11 is to perform a write operation, the host system 11 may issue a write command. The memory management circuit 502 extracts an active physical erase unit from the free area 604, and writes the data (also called update data) included in the write command from the host system 11 to the active physical erase unit.

Specifically, when the memory storage device 10 receives a write command from the host system 11, the data in the write command from the host system 11 may be written to an active physical erase unit in the free area 604. Moreover, when a physical erase unit is full, the memory management circuit 502 extracts an empty physical erase unit from the free area 604 as another active physical erase unit, so as to continue to write the update data corresponding to the write command from the host system 11.

Figure 8:
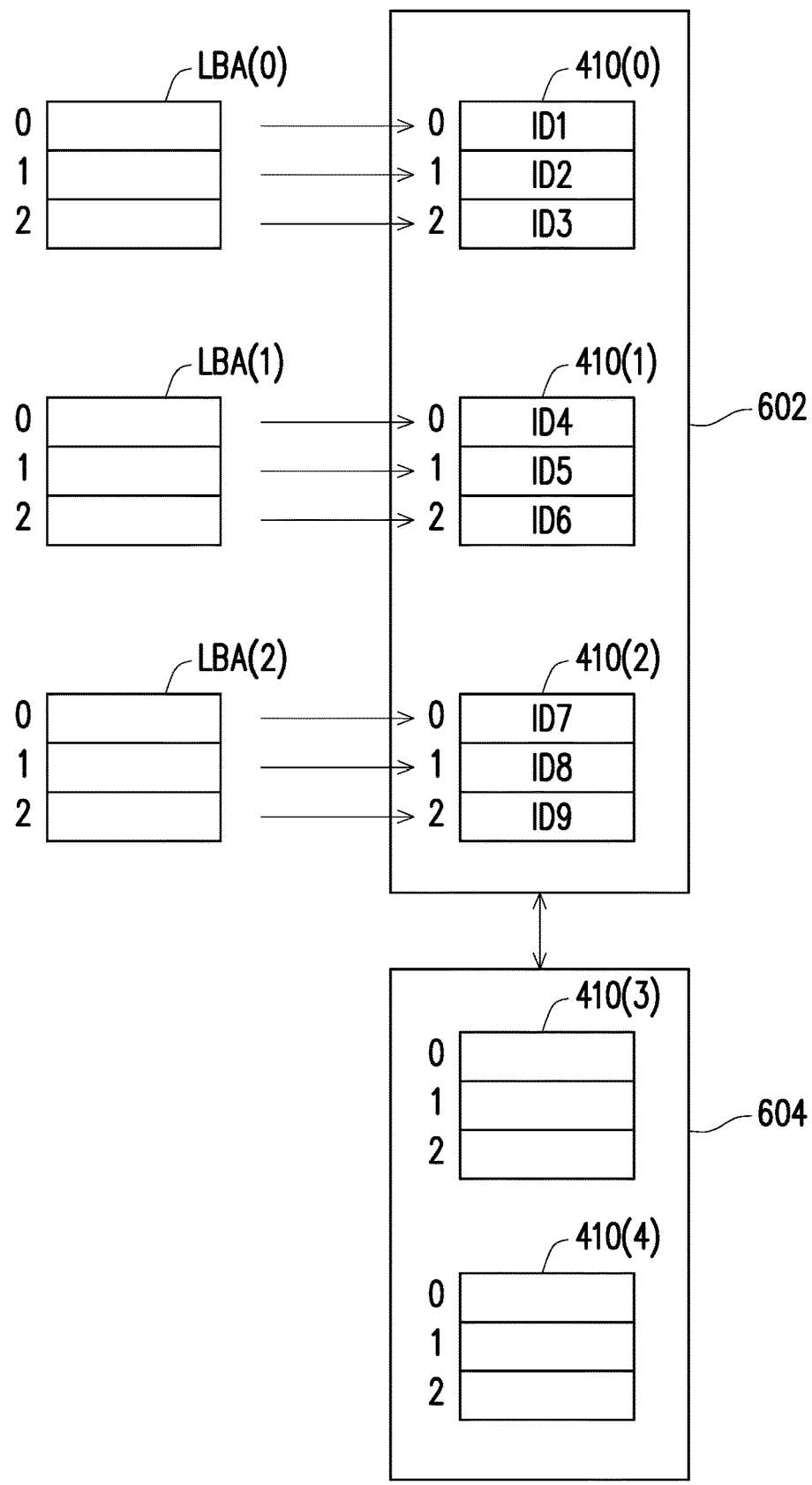
FIG. 8 is a simplified example of updating a logical address-physical address mapping table shown according to an embodiment of the invention.

FIG. 8 is a simplified example of updating a logical address-physical address mapping table shown according to an embodiment of the invention.

For the convenience of description, it is assumed that the data area 602 has three physical erase units, which are physical erase units 410(0) to 410(2) respectively, and the free area 604 has two physical erase units, which are physical erase units 410(3) to 410(4) respectively. Each of the physical erase units has three physical programming units.

Referring to FIG. 8, it is assumed that in the state of the memory storage device 10 of FIG. 8, the logical pages of the logical units LBA(0) to LBA(2) map the physical programming units of the physical erase units 410 (0) to 410 (2) of the data area 602, and the free area 604 has the physical erase units 410(3) to 410(4). In other words, the memory management circuit 502 records the mapping relationship between the logical units LBA(0) to LBA(2) and the physical erase units 410(0) to 410(4) in the logical address-physical address mapping table, and regards the physical programming units of the physical erase units 410(0) to 410(2) as having stored the data of the logical pages belonging to the logical units LBA(0) to LBA(2) (that is, initial data ID1 to ID9). In particular, in the present exemplary embodiment, it is assumed that the 0th to 2nd logical pages of the current logical unit LBA(0) are respectively mapped to the 0th to 2nd physical programming units of the physical erase unit 410(0), the 0th to 2nd logical pages of the logical unit LBA(1) are respectively mapped to the 0th to 2nd physical programming units of the physical erase unit 410(1), and the 0th to 2nd logical pages of the logical unit LBA(2) are respectively mapped to the 0th to 2nd physical programming units of the physical erase unit 410(2). Moreover, the memory management circuit 502 records the available physical erase units 410(3) to 410(4) in the free area 604, and when the host system 11 performs a write operation, in the traditional method, the memory management circuit 502 records the mapping information of the update data corresponding to the write operation in a physical address-logical address mapping table (also called a dynamic mapping table) in the buffer memory 508.

It should be mentioned that, in the conventional method, when the host system 11 performs a write operation related to a logical page, the memory management circuit 502 issues a write command sequence to the rewritable non-volatile memory module 406. The control circuit in the rewritable non-volatile memory module 406 writes the update data corresponding to the write operation to the active physical erase unit selected from the free area 604. At the same time, the memory management circuit 502 does not immediately change the mapping relationship between the logical units LBA(0) to LBA(2) and the physical erase units 410(0) to 410(4) in the logical address-physical address mapping table, and the memory management circuit 502 records the address of the physical programming units configured to store the update data (also known as the physical address) in the active physical erase unit in the dynamic mapping table in the buffer memory 508 along with the address of the logical page (also referred to as the logical address) corresponding to the write operation. Only after the dynamic mapping table is full is the corresponding logical address-physical address mapping table (also called static mapping table) from the rewritable non-volatile memory module 406 in the buffer memory 508 loaded according to the mapping information in the dynamic mapping table (that is, the logical address corresponding to the update data), and after the mapping relationship between the logical units LBA(0) to LBA(2) and the physical erase units 410(0) to 410(4) is updated, the updated static mapping table is stored back to the rewritable non-volatile memory module 406. It should be mentioned that, when the memory storage device 10 is in an idle state for a period of time (e.g., no command is received from the host system 11 for 30 seconds), the memory management circuit 502 may also load the corresponding static mapping table into the buffer memory 508 according to the mapping information in the dynamic mapping table, and store the updated static mapping table back to the rewritable non-volatile memory module 406 after updating the mapping relationship between the logical units LBA(0) to LBA(2) and the physical erase units 410(0) to 410(4).

That is to say, in the conventional method of updating the mapping information in the logical address-physical address mapping table, the following three steps are usually performed in sequence: loading the static mapping table into the buffer memory 508; updating the mapping information of the static mapping table; and storing the updated static mapping table back to the rewritable non-volatile memory module 406.

It is worth noting that before the static mapping table is updated, the latest mapping relationship between the physical address and the logical address is recorded in the dynamic mapping table. Therefore, when reading data, the memory management circuit 502 first instructs the read data to search the mapping information in the dynamic mapping table according to the read command to obtain the physical address mapped by the logical address corresponding to the data. When the logical address corresponding to the data does not exist in the dynamic mapping table, the physical address mapped by the logical address is obtained by searching the mapping information of the static mapping table according to the logical address. Since the dynamic mapping table usually only temporarily stores data in a specific range, the memory management circuit 502 searches the static mapping table to find the physical address corresponding to the read command in most cases. However, the latest mapping information is recorded in the dynamic mapping table. If the memory management circuit 502 skips the step of searching the dynamic mapping table when reading data, old data may be read. In other words, in the process of reading data, the memory management circuit 502 needs to spend time searching the dynamic mapping table and the static mapping table to obtain the physical address newly mapped by the logical address, thus reducing the performance of the memory management circuit 502 during reading.

Therefore, the invention provides a mapping table management method, wherein when the control circuit in the rewritable non-volatile memory module 406 writes the update data corresponding to the write operation to the physical programming units, the memory management circuit 502 may update the dynamic mapping table and the relation management information temporarily stored in the buffer memory 508. In particular, the relation management information may reflect the group static mapping table related to the logical address recorded in the dynamic mapping table. That is, after searching the relation management information, the memory management circuit 502 may obtain related information of the group static mapping table related to the logical address recorded in the dynamic mapping table.

The mapping table management method of the invention is described below using FIG. 8 to FIG. 12.

Please refer to FIG. 8 and FIG. 9 first. FIG. 9 is a simplified example of a group static mapping table shown according to an embodiment of the invention. In the present exemplary embodiment, the static mapping table is divided into a plurality of group logical address-physical address mapping tables (also referred to as group static mapping tables). For the convenience of explanation, it is assumed here that the memory management circuit 502 configures one group static mapping table 901 for the logical unit LBA(0), configures one group static mapping table 902 for the logical unit LBA(1), and configures one group static mapping table 903 for the logical unit LBA(2). As shown in FIG. 9, the group static mapping table 901 records that the 0th to 2nd logical pages of the logical unit LBA(0) (that is, the logical pages corresponding to the logical addresses LBA(0)-0 to LBA(0)-2) respectively correspond to the 0th to 2nd physical programming units of the physical erase unit 410(0) (that is, the physical programming units corresponding to the physical addresses 410(0)-0 to 410(0)-2). That is, the physical programming units corresponding to the physical addresses 410(0)-0 to 410(0)-2 respectively store the data written by the host system 11 in the physical pages corresponding to the logical addresses LBA(0)-0 to LBA(0)-2.

Moreover, the group static mapping table 902 records that the 0th to 2nd logical pages of the logical unit LBA(1) (that is, the logical pages corresponding to the logical addresses LBA(1)-0 to LBA(1)-2) correspond to the 0th to 2nd physical programming units of the physical erase unit 410(1), respectively (that is, the physical programming units corresponding to the physical addresses 410(1)-0 to 410(1)-2, and the group static mapping table 903 records that the 0th to 2nd logical pages of the logical unit LBA(2) (that is, the logical pages corresponding to the logical addresses LBA (2)-0 to LBA(2)-2) correspond to the 0th to 2nd physical programming units of the physical erase unit 410(2) respectively (that is, the physical programming units corresponding to the physical addresses 410(2)-0 to 410(2)-2).

Figure 10:
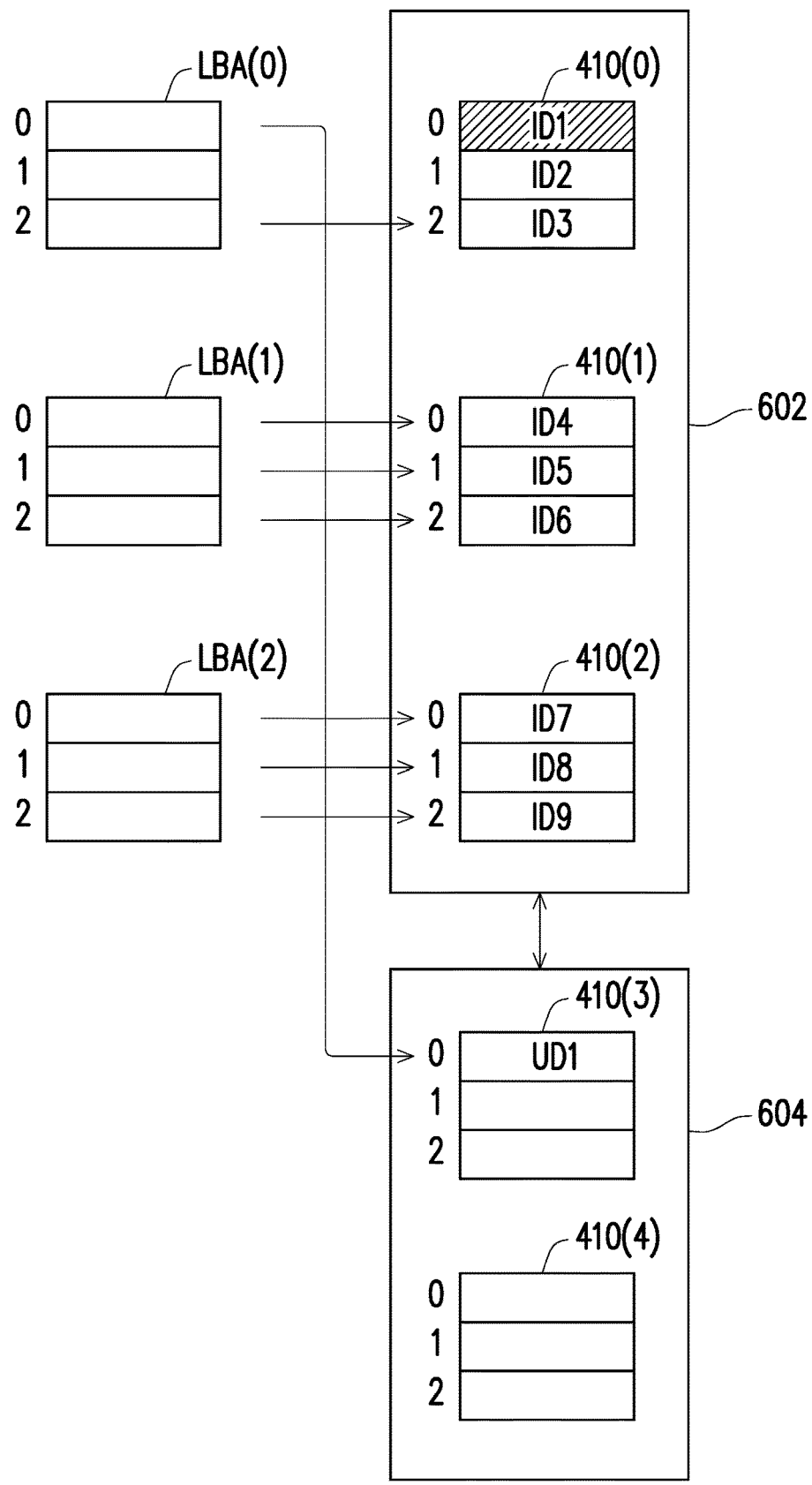
FIG. 10 is a simplified example of updating a logical address-physical address mapping table shown according to an embodiment of the invention.

FIG. 10 is a simplified example of updating a logical address-physical address mapping table shown according to an embodiment of the invention. It is assumed that the host system 11 is to write an update data UD1 to the rewritable non-volatile memory module 406. The update data UD1 is the 0th logical page belonging to the logical unit LBA(0). At this time, the host system 11 may issue a write command corresponding to the update data UD1 to the memory management circuit 502. When the memory management circuit 502 receives a write command from the host system 11, the update data UD1 (also referred to as the second data) in the write command may be written to the rewritable non-volatile memory module 406, and the dynamic mapping table and the relation management information may be updated at the same time. In the present exemplary embodiment, the memory management circuit 502 extracts, for example, the physical erase unit 410(3) from the free area 604 as the active physical erase unit, and issues a write command sequence to instruct the control circuit of the rewritable non-volatile memory module 406 to write the update data UD1 to the 0th physical programming unit of the physical erase unit 410(3) (also referred to as the first physical programming unit). At the same time, the memory management circuit 502 updates the dynamic mapping table and the relation management information according to the logical address LBA(0)-0 of the 0th logical page of the logical unit LBA(0) to which the update data UD1 belongs and the physical address 410(3)-0 of the first physical programming unit written by the update data UD1.

Figure 11:
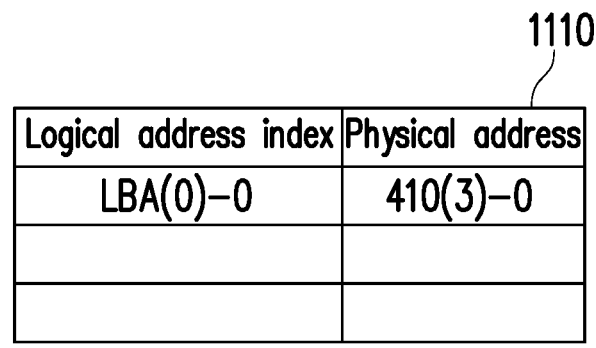
FIG. 11 is an example of a dynamic mapping table shown according to an embodiment of the invention.

FIG. 11 is an example of a dynamic mapping table shown according to an embodiment of the invention. Referring to FIG. 11, a dynamic mapping table 1110 is stored in the buffer memory 508. When the memory management circuit 502 writes the update data UD1 to the 0th physical programming unit of the physical erase unit 410(3), the memory management circuit 502 updates the mapping information of the dynamic mapping table 1110, such that the logical address LBA(0)-0 of the 0th logical page of the logical unit LBA(0) to which the update data UD1 belongs is mapped to the physical address 410(3)-0 of the 0th physical programming unit of the physical erase unit 410(3) written by the update data UD1. In other words, the dynamic mapping table 1110 records the logical address corresponding to the update data UD1 (that is, the write data) and the physical address mapped by the logical address.

In the present exemplary embodiment, when the memory management circuit 502 writes the update data UD1 to the 0th physical programming unit of the physical erase unit 410(3), the memory management circuit 502 also records the group static mapping table 901 related to the logical address LBA(0)-0 of the 0th logical page of the logical unit LBA(0) to which the update data UD1 belongs in the relation management information. However, the invention does not limit the way of recording the group static mapping table here.

Figure 12:
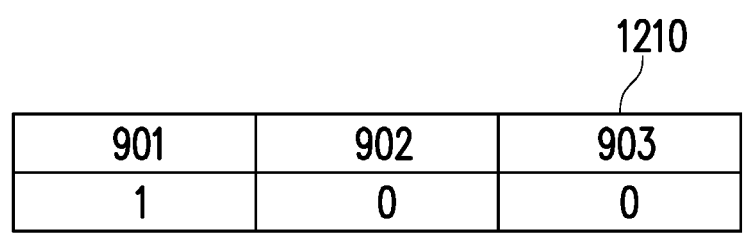
FIG. 12 is an example of a relation management information shown according to an embodiment of the invention.

For example, the relation management information may include one bit mapping table, as shown in FIG. 12. For example, the information in each storage field in the bit mapping table may reflect whether the logical address included in the corresponding group static map is recorded in the dynamic mapping table. For example, if the information in a certain storage field in the relation management information is value "0" (or a certain default value), none of the logical addresses included in the group static mapping table corresponding to the storage field is recorded in the dynamic mapping table. In contrast, if the information in a certain storage field in the relation management information is value "1" (or a certain default value), at least one logical address included in the group static mapping table corresponding to the storage field is recorded in the dynamic mapping table. In other words, the relation management information reflects the group static mapping table related to the logical address recorded in the dynamic mapping table.

FIG. 12 is an example of a relation management information shown according to an embodiment of the invention. A relation management information 1210 is stored in the buffer memory 508. Referring to both FIG. 10 and FIG. 12, when the memory management circuit 502 writes the update data UD1 to the 0th physical programming unit of the physical erase unit 410(3), the memory management circuit 502 may update the relation management information 1210 such that the relation management information 1210 reflects that the group static mapping table 901 recording the logical address LBA(0)-0 of the 0th logical page of the logical unit LBA(0) is related to the dynamic mapping table 1110. For example, the memory management circuit 502 may record the storage field of the group static mapping table 901 in the relation management information 1210 as value "1". That is, the relation management information 1210 reflects the group static mapping table 901 related to the logical address LBA(0)-0 recorded in the dynamic mapping table 1110.

In the present exemplary embodiment, the memory management circuit 502 may receive a read command from the host system 11. The read command may instruct to read data stored in a logical unit. It is assumed that the read command instructs to read the data (also referred to as the first data) in the address (also referred to as the first logical address) of the 0th logical page of the logical unit LBA(0), and the memory management circuit 502 searches whether the relation management information reflects that the group static mapping table (also referred to as the first group static mapping table) recording the first logical address is related to the dynamic mapping table.

Referring to the example of FIG. 12, the memory management circuit 502 searches whether the relation management information 1210 reflects the group static mapping table 901 (that is, the first group static mapping table) recording the logical address LBA(0)-0 of the 0th logical page of the logical unit LBA(0) is related to dynamic mapping table 1110. The storage field corresponding to the group static mapping table 901 in the relation management information 1210 shown in FIG. 12 is recorded as value "1", indicating that the relation management information 1210 reflects that the group static mapping table 901 is related to the dynamic mapping table 1110. Here, in response to this search result reflecting that the group static mapping table 901 is related to the dynamic mapping table 1110, the memory management circuit 502 searches the dynamic mapping table 1110 to obtain the physical address 410(3)-0 (also referred to as the first physical address) mapped by the logical address LBA(0)-0.

In another embodiment, it is assumed that the storage field corresponding to the group static mapping table 901 in the relation management information is recorded as value of "0", meaning that the relation management information does not reflect that the group static mapping table 901 is related to the dynamic mapping table 1110. Here, in response to this search result not reflecting that the group static mapping table 901 is related to the dynamic mapping table 1110, the memory management circuit 502 searches the group static mapping table 901 to obtain the physical address 410(0)-0 (also referred to as the second physical address) mapped by the logical address LBA(0)-0. Specifically, the memory management circuit 502 may maintain the address management information, and the address management information reflects the storage address of the group static mapping table in the rewritable non-volatile memory module 406. Therefore, before the memory management circuit 502 searches the group static mapping table 901, the address management information may be searched first to obtain the storage address of the group static mapping table 901, and the desired group static mapping table 901 may be read from the storage address.

After the physical address (such as the first physical address or the second physical address) mapped by the data to be read instructed by the read command is obtained, the memory management circuit 502 may issue a read command to the rewritable non-volatile memory module 406 to read the data stored in the physical address from the rewritable non-volatile memory module 406.

In particular, in the mapping table management method, the memory management circuit 502 may quickly obtain the latest mapping information of whether the data to be read is recorded in the dynamic mapping table by first searching the relation management information. It is worth noting that searching the relation management information takes less time than searching the entire dynamic mapping table. In other words, the mapping table management method of the invention may effectively improve the speed of the memory management circuit 502 searching the physical address stored in the data when a data read operation is performed. Therefore, the performance of the memory management circuit 502 when reading data is improved.

Referring further to FIG. 9 and FIG. 11, after the dynamic mapping table is full or the memory storage device 10 is in an idle state for a period of time, the memory management circuit 502 may load the corresponding group static mapping table (e.g., the group static mapping table 901) from the rewritable non-volatile memory module 406 into the buffer memory 508 according to the mapping information in the dynamic mapping table. For example, when the memory management circuit 502 loads the corresponding group static mapping table according to the mapping information in the dynamic mapping table, the address management information may be searched to obtain the storage address of the group static mapping table, and the desired group static mapping table may be read from the storage address. Then, the memory management circuit 502 updates the group static mapping table 901 according to the mapping information of the dynamic mapping table 1110, such that the logical address LBA(0)-0 of the 0th logical page of the logical unit LBA(0) in the group static mapping table 901 is mapped to the physical address 410(3)-0 of the 0th physical programming unit of the physical erase unit 410(3). Moreover, after the group static mapping table 901 is updated, the memory management circuit 502 stores the updated group static mapping table 901 back to the rewritable non-volatile memory module 406. Moreover, the memory management circuit 502 may update the address management information according to the storage address. While updating the group static mapping table 901, the memory management circuit 502 may update the storage field corresponding to the group static mapping table 901 in the relation management information 1210 of FIG. 12 to value "0", such that the relation management information 1210 no longer reflects that the group static mapping table 901 is related to the dynamic mapping table 1110. However, the invention does not limit the timing of updating the group static mapping table here.

Figure 13:
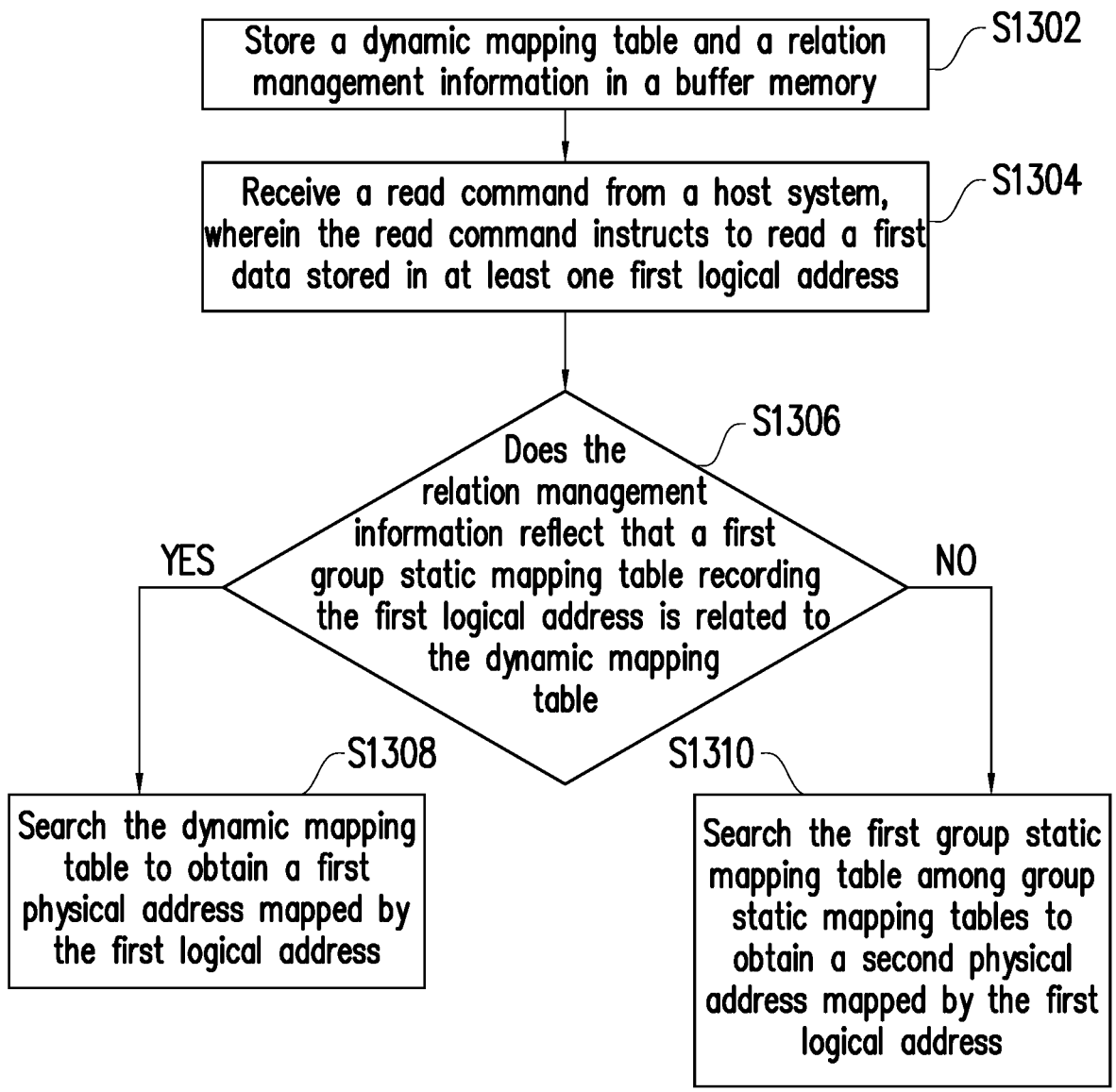
FIG. 13 is a flowchart of a mapping table management method shown according to an exemplary embodiment.

FIG. 13 is a flowchart of a mapping table management method shown according to an exemplary embodiment.

Referring to FIG. 13, in step S1302, the memory management circuit 502 stores a dynamic mapping table and a relation management information in a buffer memory. In step S1304, the memory management circuit 502 receives a read command from a host system. In particular, the read command instructs to read a first data stored in at least one first logical address. In step S1306, the memory management circuit 502 searches whether the relation management information reflects that a first group static mapping table recording the first logical address is related to the dynamic mapping table. If the relation management information reflects that the first group static mapping table recording the first logical address is related to the dynamic mapping table (that is, the determination of step S1306 is "yes"), then, in step S1308, the memory management circuit 502 searches the dynamic mapping table to obtain a first physical address mapped by the first logical address. If the relation management information does not reflect that the first group static mapping table recording the first logical address is related to the dynamic mapping table (that is, the determination of step S1306 is "no"), then, in step S1310, the memory management circuit 502 searches the first group static mapping table in the group static mapping table to obtain a second physical address mapped by the first logical address.

However, each step in FIG. 13 is as described in detail above, and is not repeated herein. It should be mentioned that, each step in FIG. 13 may be implemented as a plurality of program codes or circuits, and the invention is not limited thereto. Moreover, the method of FIG. 13 may be used with the above exemplary embodiments, and may also be used alone, and the invention is not limited thereto.

Based on the above, the mapping table management method, the memory control circuit unit, and the memory storage device of the invention manage the relationship between the dynamic mapping table and the group static mapping table via the relation management information, thereby accelerating the speed of searching the physical address. In an embodiment of the invention, the information of the group static mapping table related to the logical address is recorded in the relation management information, and when a data read operation is performed, whether the relation management information reflects that the group static mapping table of the logical address to which the data to be read belongs is related to the dynamic mapping table is first searched. Accordingly, whether the latest mapping information of the data to be read is recorded in the dynamic mapping table may be quickly obtained, thereby effectively improving the speed of the memory management circuit searching the physical address of the data stored when a data reading operation is performed. Thus, the performance of the memory management circuit when reading data is improved.

Although the invention has been described with reference to the above embodiments, it will be apparent to one of ordinary skill in the art that modifications to the described embodiments may be made without departing from the spirit of the disclosure. Accordingly, the scope of the disclosure is defined by the attached claims not by the above detailed descriptions.

What is claimed is:

1. A mapping table management method, suitable for controlling a rewritable non-volatile memory module, wherein the rewritable non-volatile memory module comprises a plurality of physical programming units, the rewritable non-volatile memory module stores a static mapping table, and the static mapping table is divided into a plurality of group static mapping tables, and the mapping table management method comprises:
   storing a dynamic mapping table and a relation management information in a buffer memory, wherein the dynamic mapping table records a logical address corresponding to a write data and a physical address mapped by the logical address, and the relation management information reflects a group static mapping table related to the logical address recorded in the dynamic mapping table;
   receiving a read command from a host system, wherein the read command instructs to read a first data stored in a first logical address; and
   searching whether the relation management information reflects that a first group static mapping table recording the first logical address is related to the dynamic mapping table,
   searching the dynamic mapping table to obtain a first physical address mapped by the first logical address in response to a search result reflecting that the first group static mapping table is related to the dynamic mapping table, and
   searching the first group static mapping table among the group static mapping tables to obtain a second physical address mapped by the first logical address in response to the search result not reflecting that the first group static mapping table is related to the dynamic mapping table.

2. The mapping table management method of claim 1, wherein the method further comprises:
   reading a data stored at the first physical address or the second physical address.

3. The mapping table management method of claim 1, wherein the mapping table management method comprises, before the step of searching the first group static mapping table among the group static mapping tables to obtain the second physical address mapped by the first logical address:
   searching an address management information to obtain a storage address of the first group static mapping table in the rewritable non-volatile memory module; and
   reading the first group static mapping table from the storage address.

4. The mapping table management method of claim 1, wherein the method further comprises:
   receiving a write command corresponding to a second data from the host system, wherein the second data corresponds to the first logical address;
   sending a command sequence to the rewritable non-volatile memory module to instruct a control circuit of the rewritable non-volatile memory module to write the second data to a first physical programming unit in the plurality of physical programming units; and
   updating the dynamic mapping table and the relation management information according to the first logical address and a physical address of the first physical programming unit in the process of writing the second data to the first physical programming unit via the control circuit of the rewritable non-volatile memory module.

5. The mapping table management method of claim 4, wherein the step of updating the dynamic mapping table and the relation management information according to the first logical address and the physical address of the first physical programming unit comprises:
   updating a mapping information of the dynamic mapping table such that the first logical address is mapped to the physical address of the first physical programming unit.

6. The mapping table management method of claim 5, wherein the method further comprises, after the mapping information of the dynamic mapping table is updated:
   loading the first group static mapping table among the plurality of group static mapping tables from the rewritable non-volatile memory module into the buffer memory according to the mapping information of the dynamic mapping table;
   updating the first group static mapping table according to the mapping information of the dynamic mapping table such that the first logical address is mapped to the physical address of the first physical programming unit; and
   storing the updated first group static mapping table back to the rewritable non-volatile memory module after the first group static mapping table is updated.

7. The mapping table management method of claim 6, wherein the step of updating the first group static mapping table further comprises:
   updating the relation management information such that the relation management information no longer reflects that the first group static mapping table is related to the dynamic mapping table.

8. The mapping table management method of claim 4, wherein the step of updating the dynamic mapping table and the relation management information according to the first logical address and the physical address of the first physical programming unit comprises:
   updating the relation management information such that the relation management information reflects that the first group static mapping table recording the first logical address is related to the dynamic mapping table.

9. A memory control circuit unit, configured to control a rewritable non-volatile memory module, wherein the rewritable non-volatile memory module comprises a plurality of physical programming units, the rewritable non-volatile memory module stores a static mapping table, and the static mapping table is divided into a plurality of group static mapping tables, and the memory control circuit unit comprises:
   a host interface configured to be coupled to a host system;
   a memory interface configured to be coupled to the rewritable non-volatile memory module; and
   a memory management circuit coupled to the host interface and the memory interface,
   wherein the memory management circuit is configured to store a dynamic mapping table and a relation management information in a buffer memory, the dynamic mapping table records a logical address corresponding to a write data and a physical address mapped by the logical address, and the relation management information reflects a group static mapping table related to the logical address recorded in the dynamic mapping table,
   the memory management circuit is further configured to receive a read command from the host system, wherein the read command instructs to read a first data stored in a first logical address, and
   the memory management circuit is further configured to search whether the relation management information reflects that a first group static mapping table recording the first logical address is related to the dynamic mapping table, in response to a search result reflecting that the first group static mapping table is related to the dynamic mapping table, the memory management circuit is further configured to search the dynamic mapping table to obtain a first physical address mapped by the first logical address, in response to the search result not reflecting that the first group static mapping table is related to the dynamic mapping table, the memory management circuit is further configured to search the first group static mapping table among the group static mapping tables to obtain a second physical address mapped by the first logical address.

10. The memory control circuit unit of claim 9, wherein the memory management circuit is further configured to read a data stored in the first physical address or the second physical address.

11. The memory control circuit unit of claim 9, wherein before searching the first group static mapping table among the group static mapping tables to obtain the second physical address mapped by the first logical address, the memory management circuit is further configured to search an address management information to obtain a storage address of the first group static mapping table in the rewritable non-volatile memory module, and the memory management circuit is further configured to read the first group static mapping table from the storage address.

12. The memory control circuit unit of claim 9, wherein the memory management circuit is further configured to receive a write command corresponding to a second data from the host system, wherein the second data corresponds to the first logical address, the memory management circuit is further configured to send a command sequence to the rewritable non-volatile memory module to instruct a control circuit of the rewritable non-volatile memory module to write the second data to a first physical programming unit in the plurality of physical programming units, and the memory management circuit is further configured to update the dynamic mapping table and the relation management information according to the first logical address and a physical address of the first physical programming unit in the process of writing the second data to the first physical programming unit via the control circuit of the rewritable non-volatile memory module.

13. The memory control circuit unit of claim 12, wherein in the operation of updating the dynamic mapping table and the relation management information according to the first logical address and the physical address of the first physical programming unit, the memory management circuit is further configured to update a mapping information of the dynamic mapping table such that the first logical address is mapped to the physical address of the first physical programming unit.

14. The memory control circuit unit of claim 13, wherein after updating the mapping information of the dynamic mapping table, the memory management circuit is further configured to load the first group static mapping table among the plurality of group static mapping tables from the rewritable non-volatile memory module into the buffer memory according to the mapping information of the dynamic mapping table, the memory management circuit is further configured to update the first group static mapping table according to the mapping information of the dynamic mapping table such that the first logical address is mapped to the physical address of the first physical programming unit, and the memory management circuit is further configured to store the updated first group static mapping table back to the rewritable non-volatile memory module after updating the first group static mapping table.

15. The memory control circuit unit of claim 14, wherein in the operation of updating the first group static mapping table, the memory management circuit is further configured to update the relation management information such that the relation management information no longer reflects that the first group static mapping table is related to the dynamic mapping table.

16. The memory control circuit unit of claim 12, wherein in the operation of updating the dynamic mapping table and the relation management information according to the first logical address and the physical address of the first physical programming unit, the memory management circuit is further configured to update the relation management information such that the relation management information reflects that the first group static mapping table recording the first logical address is related to the dynamic mapping table.

17. A memory storage device, comprising:
a connection interface unit configured to be coupled to a host system;
a rewritable non-volatile memory module, wherein the rewritable non-volatile memory module comprises a plurality of physical programming units, the rewritable non-volatile memory module stores a static mapping table, and the static mapping table is divided into a plurality of group static mapping tables; and
a memory control circuit unit coupled to the connection interface unit and the rewritable non-volatile memory module,
wherein the memory control circuit unit is configured to store a dynamic mapping table and a relation management information in a buffer memory, the dynamic mapping table records a logical address corresponding to a write data and a physical address mapped by the logical address, and the relation management information reflects a group static mapping table related to the logical address recorded in the dynamic mapping table,
the memory control circuit unit is further configured to receive a read command from the host system, wherein the read command instructs to read a first data stored in a first logical address, and
the memory control circuit unit is further configured to search whether the relation management information reflects that a first group static mapping table recording the first logical address is related to the dynamic mapping table,
in response to a search result reflecting that the first group static mapping table is related to the dynamic mapping table, the memory control circuit unit is further configured to search the dynamic mapping table to obtain a first physical address mapped by the first logical address,
in response to the search result not reflecting that the first group static mapping table is related to the dynamic mapping table, the memory control circuit unit is further configured to search the first group static mapping table among the group static mapping tables to obtain a second physical address mapped by the first logical address.

18. The memory storage device of claim 17, wherein the memory control circuit unit is further configured to read a data stored in the first physical address or the second physical address.

19. The memory storage device of claim 17, wherein before searching the first group static mapping table among the group static mapping tables to obtain the second physical address mapped by the first logical address, the memory control circuit unit is further configured to search an address management information to obtain a storage address of the first group static mapping table in the rewritable non-volatile memory module, and the memory control circuit unit is further configured to read the first group static mapping table from the storage address.

20. The memory storage device of claim 17, wherein the memory control circuit unit is further configured to receive a write command corresponding to a second data from the host system, and the second data corresponds to the first logical address, the memory control circuit unit is further configured to send a command sequence to the rewritable non-volatile memory module to instruct a control circuit of the rewritable non-volatile memory module to write the second data to a first physical programming unit in the plurality of physical programming units, and the memory control circuit unit is further configured to update the dynamic mapping table and the relation management information according to the first logical address and a physical address of the first physical programming unit in the process of writing the second data to the first physical programming unit via the control circuit of the rewritable non-volatile memory module.

21. The memory storage device of claim 20, wherein in the operation of updating the dynamic mapping table and the relation management information according to the first logical address and the physical address of the first physical programming unit, the memory control circuit unit is further configured to update a mapping information of the dynamic mapping table such that the first logical address is mapped to the physical address of the first physical programming unit.

22. The memory storage device of claim 21, wherein after updating the mapping information of the dynamic mapping table, the memory control circuit unit is further configured to load the first group static mapping table among the plurality of group static mapping tables from the rewritable non-volatile memory module into the buffer memory according to the mapping information of the dynamic mapping table, the memory control circuit unit is further configured to update the first group static mapping table according to the mapping information of the dynamic mapping table such that the first logical address is mapped to the physical address of the first physical programming unit, and the memory control circuit unit is further configured to store the updated first group static mapping table back to the rewritable non-volatile memory module after updating the first group static mapping table.

23. The memory storage device of claim 22, wherein in the operation of updating the first group static mapping table, the memory control circuit unit is further configured to update the relation management information such that the relation management information no longer reflects that the first group static mapping table is related to the dynamic mapping table.

24. The memory storage device of claim 20, wherein in the operation of updating the dynamic mapping table and the relation management information according to the first logical address and the physical address of the first physical programming unit, the memory control circuit unit is further configured to update the relation management information such that the relation management information reflects that the first group static mapping table recording the first logical address is related to the dynamic mapping table.

* * * * *